United States Patent [19]

Fridez et al.

[11] Patent Number: 4,971,939

[45] Date of Patent: Nov. 20, 1990

[54] PROCESS FOR APPLYING A CATALYST LAYER COMPOSED OF NOBLE METALS AND/OR NOBLE-METAL COMPOUNDS TO A SUPPORT MADE OF CERAMIC MATERIAL

[75] Inventors: Jean-Daniel Fridez, Wohlenschwil; Gabriele Gerharz, Untersiggenthal, both of Switzerland

[73] Assignee: Asea Brown Boveri Ltd, Baden, Switzerland

[21] Appl. No.: 338,198

[22] Filed: Apr. 13, 1989

[30] Foreign Application Priority Data

Apr. 26, 1988 [DE] Fed. Rep. of Germany ....... 3813947

[51] Int. Cl.$^5$ ...................... B01D 21/06; B01D 23/42; B01D 23/50; B01D 27/24
[52] U.S. Cl. .................................... 502/200; 502/330; 502/347; 423/213.5
[58] Field of Search ....................... 502/200, 330, 347; 423/213.5

[56] References Cited

U.S. PATENT DOCUMENTS

| | | | |
|---|---|---|---|
| 2,106,744 | 2/1938 | Hood et al. | 106/36.1 |
| 3,957,692 | 5/1976 | Cairns et al. | 502/336 X |
| 4,252,690 | 2/1981 | Kamiya et al. | 252/470 |
| 4,350,613 | 9/1982 | Nishino et al. | 502/200 |
| 4,559,277 | 12/1985 | Ito | 428/627 |
| 4,562,121 | 12/1985 | Thiemann et al. | 428/607 |

FOREIGN PATENT DOCUMENTS

| | | |
|---|---|---|
| 0143956 | 6/1985 | European Pat. Off. . |
| 1030756 | 5/1958 | Fed. Rep. of Germany . |
| 1043918 | 11/1958 | Fed. Rep. of Germany . |
| 1045305 | 5/1959 | Fed. Rep. of Germany . |
| 2245095 | 10/1973 | Fed. Rep. of Germany . |

OTHER PUBLICATIONS

Sprechsaal, vol. 105, pp. 848-859 (1972).
A. F. M. Leenaars et al., "Porous Alumina Membranes," Chemtech, Sep. 1986, pp. 560-564.
R. J. Charles, "Phase Separation in Borosilicate Glasses," Journal of the American Ceramic Society, vol. 47, No. 11, pp. 559-563.
M. G. Nicholas et al., "Ceramic/Metal Joining for Structural Applications" (1985 The Institute of Metals), Materials Science and Technology, Sep. 1985, vol. 1, pp. 657-665.

*Primary Examiner*—W. J. Shine
*Attorney, Agent, or Firm*—Oblon, Spivak, McClelland, Maier & Neustadt

[57] ABSTRACT

Process for applying a catalyst layer (4) composed of noble metals and/or noble-metal compounds to a ceramic support (1), in which a foil (2) made of an Ag/Ti alloy is first placed on the surface of the support (1) and this is fused in vacuo by heat treatment, cooled down again and firmly bound to the support (1). The catalyst layer (4) is in turn deposited in an electrochemical manner on the electrically conducting intermediate layer.

2 Claims, 1 Drawing Sheet

PROCESS FOR APPLYING A CATALYST LAYER COMPOSED OF NOBLE METALS AND/OR NOBLE-METAL COMPOUNDS TO A SUPPORT MADE OF CERAMIC MATERIAL

BACKGROUND OF THE INVENTION

1. Field of the invention

Catalyst layers on ceramic supports for converting exhaust gases from internal combustion engines.

The invention relates to compact devices for postburning and detoxicating the exhaust gases from internal combustion engines of road vehicles, especially in relation to supercharger units.

In particular it relates to a process for applying a catalyst layer composed of noble metals and/or noble-metal compounds to a support made of ceramic material.

2. Discussion of background

Catalysts for converting the exhaust gases of internal combustion engines (spark-ignition and diesel engines) are increasingly being used in particular for road vehicles, especially in view of the environmental pollution. The legal regulations in this connection are continuously becoming stricter and it is therefore in the interests of the general public to exploit all the possibilities for detoxicating exhaust gases. The following publications are cited in relation to the prior art:

Edgar Koberstein, Katalysatoren zur Reinigung von Autoabgasen (Catalysts for purifying vehicle exhaust gases), Chemie in unserer Zeit, Vol. 18, 1984, No. 2, pages 37–45

Polat Oeser and Walter Brandstetter, Grundlagen zur Abgasreinigung von Ottomotoren mit der Katalysator technik (Principles of purifying the exhaust gases from spark-ignition engines using the catalyst technique), MTZ Motortechnische Zeitschrift 45 (1984), 5, pages 201–206

A.F.M. Leenaars, K. Kreizer and A.J. Bruggraf, Porous alumina membranes, Chemtech Sept. 1986, pages 560–564

US-A-2,106,744

R.J. Charles, Phase Separation in Borosilicate Glasses, Journal of The American Ceramic Society-Charles, Vol. 47, No. 11, pages 550–563

M.G. Nicholas and D.A. Mortimer, Ceramic/metal joining for structural applications (1985 The Institute of Metals), Materials Science and Technology, Sept. 1985, Vol. 1, pages 657–665

EP-A-0,143,956.

EP-A-0,143,956 describes a volumetric super-charger unit (pressure-wave machine) for a road vehicle engine, which supercharger unit has a rotor which is simultaneously constructed as a catalyst support. This makes it possible to economize at least partly on a separate device for detoxicating the exhaust gases. However, problems arose in coating a rotor composed of a ceramic material since the rotor and, consequently, the catalyst layer are exposed to very high mechanical and thermal stresses (centrifugal forces, changes in temperature). The layers have to be securely anchored and must not peel off during operation.

There is therefore a considerable need for further development and perfection of the catalyst coating technology.

SUMMARY OF THE INVENTION

Accordingly, one object of this invention is to provide a novel process for applying a catalyst layer composed of noble metals and/or noble-metal compounds to a base made of ceramic material, which process can be applied in a simple manner even to complexly shaped bodies and yields securely adhering surface layers which do not peel off. The results should be reproducible. The process should furthermore be capable of being carried out cheaply. In particular, it should advantageously be applicable to $Si_3N_4$ ceramic.

This object is achieved by a process of the type mentioned in the introductions, which comprises producing an electrically conducting intermediate layer by first applying a thin foil of a silver-titanium alloy, subjecting the latter to a heat treatment in vacuo for 3 to 30 min at a temperature above the melting point of silver and cooling it down, and which comprises applying the catalyst layer electrolytically to the body prepared in this manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
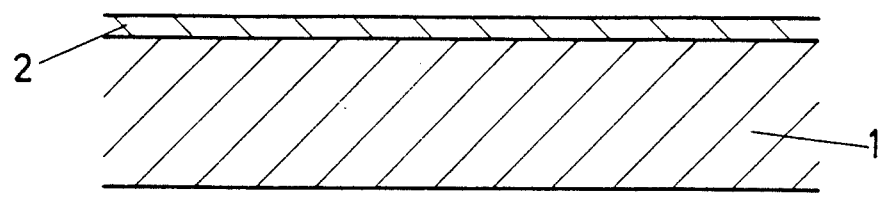
FIG. 1 shows a longitudinal section through a ceramic body with a metallic foil placed on it.

Referring now to the drawings, wherein like reference numerals designate identical or corresponding parts throughout the several views, FIG. 1 shows a diagrammatic longitudinal section through a ceramic body with a metal foil placed on it. 1 is a support made of ceramic material, in the present case made of silicon nitride $Si_3N_4$. 2 is a thin metallic foil, in the present case, for example, an Ag/Ti alloy containing 3 to 5 % of titanium as the reactive element.

Figure 2:
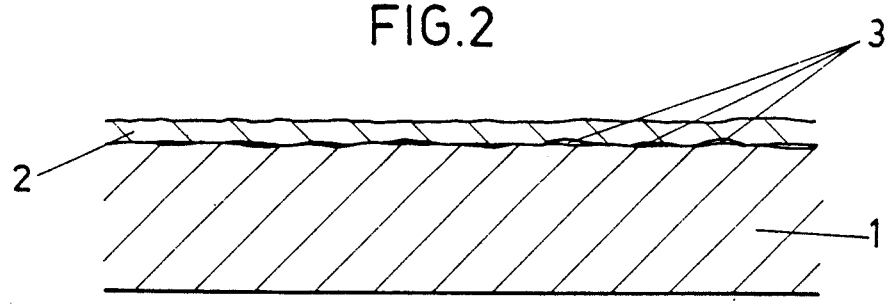
FIG. 2 shows a longitudinal section through a ceramic body with a metallic layer applied to it.

FIG. 2 relates to a diagrammatic longitudinal section through a ceramic body with an applied metallic layer. 1 is the support made of ceramic material, 2 is the now fused and resolidified foil made of an Ag/Ti alloy and 3 is a more or less continuous TiN layer or a TiN layer present as islands.

Figure 3:
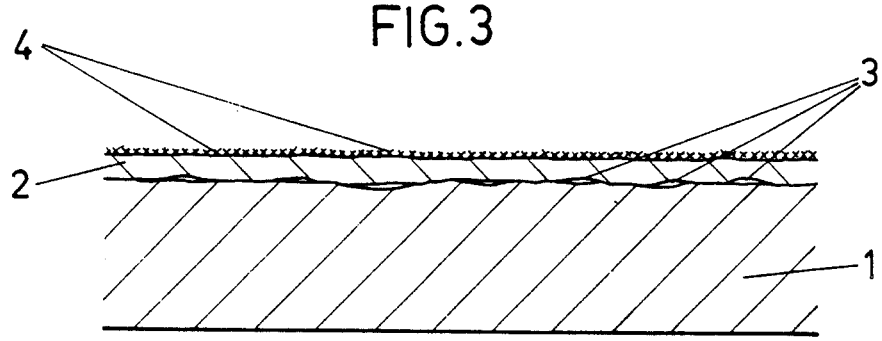
FIG. 3 shows a longitudinal section through a ceramic body with a metallic layer applied to it and a catalyst layer.

FIG. 3 shows a diagrammatic longitudinal section through a ceramic body with an applied metallic layer and a catalyst layer. 1 is the support made of ceramic material, 2 is the fused and resolidified foil made of an Ag/Ti alloy and 3 is the layer of TiN. The catalyst layer 4 deposited as very fine needles by an electrolytic process is firmly bound to the material of the foil 2.

Exemplary embodiment: See FIGS. 1 to 3

A cell rotor of a pressure-wave machine was provided with a catalyst layer 4 on its outer surface. The rotor serving as support 1 was composed of $Si_3N_4$ and had an outside diameter of 180 mm and a length of 150 mm. The outer hollow-cylindrical part had a radial wall thickness of 4 mm. The cell walls had a thickness of 1.6 mm. A foil 2 made of an Ag/Ti alloy 50 μm thick was placed on the outer surface of this support. The alloy had the following composition:
Ag=96 % by weight
Ti=4 % by weight The whole was now placed in a furnace and was heat-treated in vacuo for a period of 15 min at a temperature of 1000° C. During this process, an exchange reaction took place at the support 1/foil 2 interface in a manner such that the titanium partially replaced the silicon and a more or less continuous layer 3 of titanium nitride TiN was formed. This layer 3 was firmly anchored to the support 1. A catalyst layer 4 containing 0.15 mg/m$^2$ platinum metal was deposited on the intermediate layer, formed by the fused and resolidified foil 2 made of the Ag/Ti alloy, by the electrolytic process of the Johnson Matthew Company, GB (JMC).

The invention is not restricted to the exemplary embodiment. The catalyst layer 4 composed of noble metals and/or noble-metal compounds, preferably of the platinum metals, can be applied to a support 1 made of ceramic material of virtually any desired composition after applying the foil 2 made of an Ag/Ti alloy. Preferably, said ceramic material is Si$_3$N$_4$, SiC and Al$_2$O$_3$. The heat treatment is carried out for 3 to 30 min above the melting point of silver. Then the body is cooled again and the catalyst layer 4 is applied by an electrolytic process. Depending on the dimensions of the body 3 to be coated, the thickness of the foil 2 is 3 to 100 μm and the heat treatment is carried out at 1000° C. in vacuo.

Obviously, numerous modifications and variations of the present invention are possible in the light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. A process for applying a catalyst layer (4) composed of noble metals and/or noble-metal compounds to a carrier made of ceramic material, which comprises producing an electrically conducting intermediate layer by first applying a thin foil of a silver-titanium alloy, subjecting the latter to a heat treatment in vacuo for 3 to 30 min at a temperature above the melting point of silver and cooling it down, and which comprises applying the catalyst layer electrolytically to the body prepared in this manner.

2. The process as claimed in claim 1, wherein the carrier is composed of silicon nitride and the silver-titanium alloy contains 3 to 5% by weight of titanium, wherein the foil has a thickness of 3 to 100 μm and wherein the heat treatment is carried out at a temperature of 1000° C., and wherein titanium partially replaces the silicon to at least partially form a more or less continuous layer of titanium nitride firmly anchored to the carrier.

* * * * *